United States Patent
Krull et al.

(10) Patent No.: US 7,713,316 B2
(45) Date of Patent: May 11, 2010

(54) FUEL OILS HAVING IMPROVED COLD FLOW PROPERTIES

(75) Inventors: Matthias Krull, Harxheim (DE); Markus Kupetz, Dinslaken (DE); Raimund Wildfang, Oberhausen (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 739 days.

(21) Appl. No.: 10/735,490

(22) Filed: Dec. 12, 2003

(65) Prior Publication Data

US 2004/0226216 A1 Nov. 18, 2004

(30) Foreign Application Priority Data

Dec. 23, 2002 (DE) ................. 102 60 714

(51) Int. Cl.
 *C10L 1/18* (2006.01)
 *C10L 1/22* (2006.01)
(52) U.S. Cl. ............... 44/393; 44/395; 44/412; 44/437; 44/443
(58) Field of Classification Search ........... 44/393, 44/395, 443, 412, 437
See application file for complete search history.

(56) References Cited

U.S. PATENT DOCUMENTS

| | | | |
|---|---|---|---|
| 4,211,534 A | | 7/1980 | Feldman |
| 4,364,743 A | * | 12/1982 | Erner ............ 44/388 |
| 4,670,516 A | | 6/1987 | Sackmann |
| 4,713,088 A | | 12/1987 | Tack |
| 4,863,486 A | | 9/1989 | Tack |
| 4,985,048 A | | 1/1991 | Wirtz et al. |
| 5,186,720 A | | 2/1993 | Feustel et al. |
| 5,254,652 A | | 10/1993 | Feustel et al. |
| 5,391,632 A | | 2/1995 | Krull et al. |
| 5,730,762 A | * | 3/1998 | Murakami et al. ........ 44/329 |
| 5,906,663 A | * | 5/1999 | Brown et al. .......... 44/393 |
| 6,106,584 A | | 8/2000 | More |
| 6,110,238 A | | 8/2000 | Krull et al. |
| 6,238,447 B1 | | 5/2001 | More |
| 6,306,186 B1 | | 10/2001 | Davies |
| 6,509,424 B1 | | 1/2003 | Krull et al. |
| 6,599,335 B1 | | 7/2003 | Krull et al. |
| 6,652,610 B2 | | 11/2003 | Krull et al. |

FOREIGN PATENT DOCUMENTS

| | | | |
|---|---|---|---|
| CA | 2242474 | | 1/1999 |
| EP | 0271738 | | 6/1988 |
| JP | 58-129096 | | 8/1983 |
| JP | 58129096 | | 1/1993 |
| WO | WO9314178 | * | 7/1993 |

OTHER PUBLICATIONS

Abstract EP 0271738, Jun. 22, 1988.
Abstract JP 58129096, Jan. 8, 1993.

* cited by examiner

*Primary Examiner*—Cephia D Toomer
(74) *Attorney, Agent, or Firm*—Tod A. Waldrop

(57) ABSTRACT

The invention relates to fuel oils comprising a larger proportion of middle distillates having a sulfur content of at most 350 ppm and an aromatics content of at most 22% by weight, and also a smaller proportion of at least one copolymer of ethylene and vinyl esters, said copolymer containing a) bivalent structural units derived from ethylene of the formula 1

$$-CH_2-CH_2- \qquad (1)$$

b) from 5 to 12 mol % of bivalent structural units of the formula 2

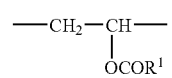

2 where $R^1$ is saturated, branched $C_5$-$C_{18}$-alkyl, and c) from 4 to 13 mol % of bivalent structural units of the formula 3

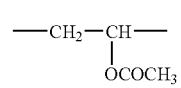

3 and the sum of the molar proportions of structural units of the formulae 2 and 3 being between 12 and 16 mol %, to the corresponding polymers, and also to their use for improving the cold flow behavior of middle distillates having a sulfur content of at most 350 ppm and an aromatics content of at most 22% by weight.

36 Claims, No Drawings

FUEL OILS HAVING IMPROVED COLD FLOW PROPERTIES

The present invention relates to mineral oils and mineral oil distillates having improved cold flow properties and a polymer for improving the cold flow properties.

Crude oils and middle distillates, such as gas oil, diesel oil or heating oil, obtained by distillation of crude oils contain, depending on the origin of the crude oils, different amounts of n-paraffins which crystallize out as platelet-shaped crystals when the temperature is reduced and sometimes agglomerate with the inclusion of oil. This causes a deterioration in the flow properties of these oils or distillates, which may result in disruption, for example, in the course of recovery, transport, storage and/or use of the mineral oils and mineral oil distillates. In the case of mineral oils, this crystallization phenomenon can cause deposits on the pipe walls in the course of transport through pipelines, especially in winter, and in individual cases, for example in the event of stoppage of a pipeline, can even lead to its complete blockage. The precipitation of paraffins can also cause difficulties in the course of storage and further processing of the mineral oils. In winter, for instance, it may be necessary under some circumstances to store the mineral oils in heated tanks. In the case of mineral oil distillates, the consequence of crystallization may be blockage of the filter in diesel engines and furnaces, which prevents reliable metering of the fuels and in some cases results in complete interruption of the fuel or heating medium feed.

In addition to the classical methods of eliminating the crystallized paraffins (thermal, mechanical or using solvents), which merely involve the removal of the precipitates which have already formed, chemical additives (known as flow improvers or paraffin inhibitors) have been developed in recent years and, by interacting physically with the precipitating paraffin crystals, lead to the modification of their shape, size and adhesion properties. The additives function as additional crystal seeds and some of them crystallize out with the paraffins, resulting in a larger number of smaller paraffin crystals having modified crystal shape. Some of the action of the additives is also explained by dispersion of the paraffin crystals. The modified paraffin crystals have a lower tendency to agglomerate, so that the oils admixed with these additives can still be pumped and processed at temperatures which are often more than 20° lower than in the case of nonadditized oils.

The flow and low-temperature behavior of mineral oils and mineral oil distillates is described by specifying the cloud point (determined to ISO 3015), the pour point (determined to ISO 3016) and the cold filter plugging point (CFPP; determined to EN 116). These parameters are measured in ° C.

Typical flow improvers for crude oils and middle distillates are copolymers of ethylene with one or more carboxylic esters of vinyl alcohol. Especially in the case of critical blending conditions, terpolymers which, in addition to ethylene, contain a short-chain and also a longer-chain, branched vinyl ester have proven useful. These feature an improved solubility in middle distillates compared to ethylene-vinyl acetate copolymers.

EP-A-0 493 769 discloses terpolymers which are prepared from ethylene, vinyl acetate and vinyl neononanoate or vinyl neodecanoate, and also their use as additives for mineral oil distillates.

EP-A-0 778 875 discloses ethylene terpolymers with short-chain vinyl esters and branched alkyl vinyl esters having up to 7 carbon atoms or nontertiary $C_8$-$C_{15}$-alkyl vinyl esters and a degree of branching of less than 6 $CH_3$/100 $CH_2$ groups as flow improvers for mineral oil diesel and biodiesel. The examples disclose ethylene terpolymers having 1.2-7.73 mol % of vinyl acetate and 7.4-12.8 mol % of vinyl 2-ethylhexanoate.

EP-A-0 890 589 discloses copolymers of ethylene and at least 3 mol % (preferably up to 15 mol %) of vinyl esters of neocarboxylic acids having from 6 to 16 carbon atoms as flow improvers for middle distillates, especially those distillates having low sulfur content, cloud point and ultimate boiling temperature. These copolymers may optionally contain up to 4% by weight (3.6 mol %) of vinyl acetate or up to 5 mol % of other monomers. The examples disclose copolymers having 4.8-13.8 mol % of vinyl neodecanoate.

EP-A-1 007 605 discloses terpolymers of ethylene, 2.5-4.5 mol % of vinyl acetate and 9.5-14 mol % of a branched vinyl ester having up to 15 carbon atoms, said polymers having an average molecular weight of 3500-6000 g/mol and a degree of branching of from 2.2 to 3.6 $CH_2$/100 $CH_3$ groups. Preference is given to using vinyl esters of nontertiary branched fatty acids.

EP-A-0 931 824 discloses additive mixtures for fuel oils having a low sulfur content and a content of n-paraffins of chain length $C_{18}$ and longer of at least 8% by weight, and said mixtures may comprise a nucleating component which comprises terpolymers of ethylene, from 1 to 10 mol % vinyl neocarboxylates and up to 10 mol % of vinyl acetate.

EP-A-0 796 306 discloses additives for stabilizing the CFPP in middle distillates. In addition to terpolymers of ethylene, vinyl acetate and vinyl neocarboxylates, these additives comprise nucleators based on copolymers having low vinyl acetate content. A disadvantage of the mixtures proposed there is the proportion of highly crystalline copolymer fractions which impair the filterability of the additized oils above the cloud point at low oil and/or additive temperatures in the course of additization.

In view of the decrease in crude oil reserves coupled with steadily rising energy demand, ever more problematic crude oils are being extracted and processed. In addition, the demands on the fuel oils, such as diesel and heating oil, produced therefrom are becoming ever more stringent, not least as a result of legislative requirements. Examples thereof are the reduction in the sulfur contents, the limitation of the ultimate boiling temperature and also of the aromatics content of middle distillates, which force the refineries into constant adaptation of the processing technology. The upgrading of the middle distillates leads in many cases to an increased proportion of paraffins, especially in the chain length range of from $C_{18}$ to $C_{24}$, which in turn has a negative influence on the cold flow properties of these fuel oils. It is therefore desirable to have cold flow improvers having an improved efficiency compared to the prior art and also having a broadened spectrum of effectiveness in these oils.

Furthermore, the total content of aromatics, which is from 25 to 35% by weight in conventional oils, is reduced by hydrogenations and/or hydrodesulfurations to below 22% by weight, sometimes to below 18% by weight and in special cases to below 15% by weight. This adversely affects the solubility of the existing cold flow improvers based on ethylene co- and terpolymers which typically contain between 10 and 15 mol % of vinyl ester. The poor solubility can lead firstly to losses of effectiveness of the additive and secondly to filtration problems of the additized fuel oil above the cloud point as a result of incompletely dissolved polymer fractions. In desulfurized middle distillates having a low content of aromatics, the prior art ethylene-vinyl acetate copolymers and also copolymers of ethylene and unsaturated esters of branched $C_4$-$C_{20}$ fatty alcohols or acids and also the terpolymers of ethylene with minor amounts of further monomers have therefore proven to be unsatisfactory with regard to solubility and effectiveness.

Additives are therefore being sought which exhibit good performance and at the same time good solubility in middle distillates having a low sulfur and aromatics content, even at low blending temperatures.

It has been found that, surprisingly, certain copolymers of ethylene, vinyl acetate and a branched vinyl ester constitute a solution to this task.

The present invention therefore provides fuel oils comprising a larger proportion of middle distillates having a sulfur content of at most 350 ppm and an aromatics content of at most 22% by weight, and also a smaller proportion of at least one copolymer of ethylene and vinyl esters, said copolymer containing a) bivalent structural units derived from ethylene of the formula 1

b) from 5 to 12 mol % of bivalent structural units of the formula 2

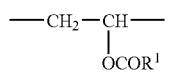

where $R^1$ is saturated, branched $C_5$-$C_{18}$-alkyl, and c) from 4 to 13 mol % of bivalent structural units of the formula 3

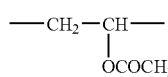

and the sum of the molar proportions of structural units of the formulae 2 and 3 being between 12 and 16 mol %.

The invention further provides a copolymer as defined above.

The invention further provides the use of copolymers as defined above for improving the cold flow behavior of middle distillates having a sulfur content of at most 350 ppm and an aromatics content of at most 22% by weight.

The invention further provides a process for improving the cold flow behavior of middle distillates having a sulfur content of at most 350 ppm and an aromatics content of at most 22% by weight by adding copolymers as defined above to it.

Particularly preferred comonomers b) are vinyl esters of branched carboxylic acids having from 5 to 15 carbon atoms, preferably from 7 to 15 carbon atoms, especially from 9 to 12 carbon atoms. The branch may be at any point in the alkyl radical, preferably in the 2- or 3-position or at the chain end of the acid radical. In particular, the branch is a tertiary carbon atom. Suitable comonomers are, for example, vinyl pivalate, vinyl isopentanoate, vinyl isohexanoate, vinyl 2-ethylhexanoate, vinyl isononanoate, vinyl isodecanoate and vinyl isotridecanoate, and particular preference is given to vinyl neononanoate, vinyl neodecanoate and/or vinyl neoundecanoate. The molar proportion of the branched vinyl ester b) is preferably between 5 and 11 mol %, especially between 6.5 and 9.4 mol %. The molar proportion of vinyl acetate c) is preferably between 4.6 and 9 mol %.

The molar proportion of ethylene a) is preferably between 79 and 88 mol %, especially between 81 and 88 mol %, for example between 83 and 88 mol % and in particular between 84 and 88 mol %.

The terpolymers according to the invention may also contain minor amounts of, for example, up to 5 mol %, preferably up to 3 mol %, of further comonomers. Suitable further comonomers are in particular olefins having from 3 to 18 carbon atoms, for example propene, n-butene, isobutene, pentene, hexene, isohexene, octene, diisobutylene, decene, norbornene, esters of acrylic acid or methacrylic acid with $C_1$-$C_{18}$-alcohols and $C_1$-$C_{18}$-alkyl vinyl ethers.

The terpolymers according to the invention preferably have molecular weights (by GPC against poly(styrene)) of from 3000 to 15 000 g/mol, in particular from 4000 to 12 000 g/mol. The degree of branching of the polymer backbone determined by means of NMR is preferably between 2 and 9 $CH_3$/100 $CH_2$ groups, in particular between 2.5 and 5 $CH_3$/100 $CH_2$ groups. This does not take into account methyl groups of the comonomers.

The copolymers preferably have melt viscosities at 140° C. of from 20 to 10 000 mPas, in particular from 30 to 5000 mPas, especially from 50 to 2000 mPas.

The copolymers can be prepared by the customary copolymerization processes, for example suspension polymerization, solution polymerization, gas phase polymerization or high pressure bulk polymerization. Preference is given to high pressure bulk polymerization at pressures of preferably from 50 to 400 MPa, in particular from 100 to 300 MPa, and temperatures of preferably from 50 to 350° C., in particular from 100 to 250° C. The reaction of the monomers is initiated by radical-forming initiators (radical chain starters). This substance class includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxide carbonate, t-butyl perpivalate, t-butyl permaleate, t-butyl perbenzoate, dicumyl peroxide, t-butyl cumyl peroxide, di-(t-butyl) peroxide, 2,2'-azobis(2-methylpropionitrile), 2,2'-azobis(2-methylbutyronitrile). The initiators are used individually or as a mixture of two or more substances in amounts of from 0.01 to 20% by weight, preferably from 0.05 to 10% by weight, based on the monomer mixture.

To attain the desired molecular weight, polymerization regulators are added to the monomer if required. Depending on the type of the regulator and the intended molecular weight, the concentration is from 0.05 to 20% by weight, preferably from 0.1 to 10% by weight, based on the monomer mixture. Suitable regulators are, for example, hydrogen, saturated or unsaturated hydrocarbons, e.g. propane or propene, aldehydes, e.g. propionaldehyde, n-butyraldehyde or isobutyraldehyde, ketones, e.g. acetone, methyl ethyl ketone, methyl isobutyl ketone, cyclohexanone, or alcohols, e.g. butanol.

The high pressure bulk polymerization is carried out in known high pressure reactors, for example autoclaves or tubular reactors, batchwise or continuously, and tubular reactors have proven particularly useful. Solvents such as aliphatic and/or aromatic hydrocarbons or hydrocarbon mixtures, benzene or toluene may be present in the reaction mixture. Preference is given to working without solvent. In a preferred embodiment of the polymerization, the mixture of the monomers, the initiator and, where used, the moderator are fed to a tubular reactor via the reactor inlet and also via one or more side branches. The monomer streams may have different compositions (EP-A-0 271 738, EP-A-0 922 716).

The additives according to the invention are added to mineral oils or mineral oil distillates in the form of solutions or dispersions. These solutions or dispersions contain preferably from 1 to 90% by weight, in particular from 5 to 80% by weight, of the copolymers. Suitable solvents or dispersants are aliphatic and/or aromatic hydrocarbons or hydrocarbon mixtures, for example benzine fractions, kerosene, decane, pentadecane, toluene, xylene, ethylbenzene or commercial solvent mixtures such as Solvent Naphtha, ®Shellsoll AB, ®Solvesso 150, ®Solvesso 200, ®Exxsol, ®ISOPAR and ®Shellsol D types. The solvent mixtures specified contain different amounts of aliphatic and/or aromatic hydrocarbons. The aliphatics may be straight-chain (n-paraffins) or branched (isoparaffins). Aromatic hydrocarbons may be mono-, di- or polycyclic and optionally bear one or more substituents. Optionally, polar solubilizers, for example butanol, 2-ethylhexanol, decanol, isodecanol or isotridecanol, benzoic acid, or higher aliphatic and also aromatic ethers and/or esters may also be added. Mineral oils or mineral oil distillates having Theological properties improved by the copolymers contain from 0.001 to 2% by weight, preferably from 0.005 to 0.5% by weight, of the copolymers, based on the distillate.

Middle distillates have in particular those mineral oils which are obtained by distilling crude oil and boil in the range from 120 to 400° C., for example, kerosene, jet fuel, diesel and heating oil. The fuel oils according to the invention contain less than 350 ppm, preferably less than 200 ppm, in particular less than 50 ppm and especially less than 10 ppm, of sulfur.

The total content of aromatics in the middle distillates has been reduced by hydrogenations and/or hydrodesulfurations to below 22% by weight, preferably to below 18% by weight and especially to below 15% by weight. Particularly advantageous results are exhibited by the additives according to the invention in narrowly cut middle distillates having a 90-20% boiling range of less than 110° C., especially less than 100° C. Preference is also given to using them in paraffin-rich middle distillates having more than 3% by weight by DSC of precipitated paraffins at 10° C. below the cloud point. Preference is also given to their use in middle distillates having a low density of less than 0.840 g/cm$^3$ and especially less than 0.835 g/cm$^3$.

In these middle distillates, the additives according to the invention exhibit a reduction in the CFPP value superior to the existing copolymers of ethylene and relatively long-chain, branched vinyl esters, coupled with simultaneously improved solubility. They can therefore be added to the oil to be additized without any problem even at relatively low temperatures. They are superior both to terpolymers having a high vinyl acetate content coupled with a simultaneously low content of relatively long-chain vinyl esters (EP 0493769, EP 1007605) and to those having a high proportion by mass of relatively long-chain, branched vinyl esters (EP 0890589). Alternatively, as a consequence of their superior solubility, they can also be added to highly paraffinic oils in high dosages of more than 500 ppm and especially more than 1000 ppm, for example from 1500 to 5000 ppm, without impairing the filterability of the additized oils above the cloud point.

The additive mixtures according to the invention are equally suitable for improving the cold flow properties of biodiesel. Biodiesel comprises fatty acid alkyl esters of fatty acids having from 14 to 24 carbon atoms and alcohols having from 1 to 4 carbon atoms. Typically, a relatively large portion of the fatty acids contains one, two or three double bonds. The fatty acid alkyl esters are more preferably, for example, rapeseed oil methyl ester and its mixtures with further vegetable oil esters. The additives according to the invention can be used with equal success in mixtures of fatty acid methyl esters and mineral oil diesel. Such mixtures preferably contain up to 25% by weight, in particular up to 10% by weight, especially up to 5% by weight, of fuel oil of animal or vegetable origin.

To prepare additive packages for specific solutions to problems, the copolymers can also be used together with one or more oil-soluble coadditives which themselves alone improve the cold flow properties of crude oils, lubricant oils or fuel oils. Examples of such coadditives are further copolymers of ethylene and olefinically unsaturated compounds, polar nitrogen compounds, alkylphenol-aldehyde resins, comb polymers, olefin copolymers and polyoxyalkylene derivatives.

For instance, mixtures of the additives according to the invention with copolymers which contain from 60 to 90% by weight of ethylene and from 10 to 40% by weight of vinyl acetate or vinyl propionate have proven outstandingly useful. In a further embodiment of the invention, the additives according to the invention are used in a mixture with ethylene terpolymers which contain two or more vinyl, acrylic and/or methacrylic esters. Particularly useful terpolymers have proven to be ethylene/vinyl acetate/vinyl 2-ethylhexanoate terpolymers, ethylene/vinyl acetate/vinyl neononate terpolymers and/or ethylene/vinyl acetate/vinyl neodecanoate terpolymers which, apart from ethylene, contain from 10 to 35% by weight of vinyl acetate and from 1 to 25% by weight of the particular long-chain vinyl ester. Further preferred copolymers, apart from ethylene and from 10 to 35% by weight of vinyl esters, also contain from 0.5 to 20% by weight of olefin having from 3 to 10 carbon atoms, for example propene, butene, isobutylene, diisobutylene, 4-methylpentene or norbornene.

The polymers according to the invention can also be used together with polar nitrogen compounds which further reduce the size of the precipitating paraffin crystals and cause the paraffin particles not to sediment, but rather to remain colloidal with a distinctly reduced tendency to sediment. Useful paraffin dispersants have proven to be oil-soluble polar compounds having ionic or polar groups, for example amine salts and/or amides which are obtained by reaction of aliphatic or aromatic amines, preferably long-chain aliphatic amines, with aliphatic or aromatic mono-, di-, tri- or tetracarboxylic acids or their anhydrides (cf. U.S. Pat. No. 4,211,534). Equally suitable as paraffin dispersants are amides and ammonium salts of aminoalkylene polycarboxylic acids such as nitrilotriacetic acid or ethylenediaminetetraacetic acid with secondary amines. Other paraffin dispersants are copolymers of maleic anhydride and $\alpha,\beta$-unsaturated compounds which may optionally be reacted with primary monoalkylamines and/or aliphatic alcohols (cf. EP 0 154 177), the reaction products of alkenyl-spiro-bislactones with amines (cf. EP 0 413 279 B1) and, according to EP 0 606 055 A2, reaction products of terpolymers based on $\alpha,\beta$-unsaturated dicarboxylic anhydrides, $\alpha,\beta$-unsaturated compounds and polyoxyalkylene ethers of lower unsaturated alcohols. Particularly preferred paraffin dispersants contain reaction products of secondary fatty amines having from 8 to 36 carbon atoms, in particular of dicoconut fatty amine, ditallow fatty amine and distearylamine, with carboxylic acids or their anhydrides.

For instance, the additives according to the invention can be used in a mixture of alkylphenol-aldehyde resins. Alkylphenol-aldehyde resins are described, for example, in Römpp Chemie Lexikon, 9th edition, Thieme Verlag 1988-92, volume 4, p. 3351 ff. The alkyl radicals of the o- or p-alkylphenol in the alkylphenol-aldehyde resins which can be used in the process according to the invention may be the same or different and have 1-50, preferably 1-20, in particular 4-12, carbon atoms; they are preferably n-, iso- and tert-butyl, n- and isopentyl, n- and isohexyl, n- and isooctyl, n- and isononyl, n- and isodecyl, n- and isododecyl and octadecyl. The aliphatic aldehyde in the alkylphenol-aldehyde resin preferably has 1-4 carbon atoms. Particularly preferred aldehydes are formaldehyde, acetaldehyde and butyraldehyde, in particular formaldehyde. The molecular weight of the alkylphenol-aldehyde resins is 400-10 000, preferably 400-5000 g/mol. A prerequisite is that the resins are oil-soluble.

In a preferred embodiment of the invention, these alkylphenol-formaldehyde resins are oligo- or polymers having a repeating unit of the formula

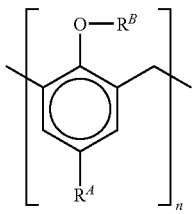

where $R^A$ is $C_4$-$C_{50}$-alkyl or -alkenyl, $R^B$ is hydrogen or a polyoxyalkylene unit of the formula $(A-O)_p$—H, where A is a $C_2$- to $C_4$-alkylene group, n is a number from 3 to 100, preferably from 4 to 20, and p is a number from 0 to 50.

Finally, in a further embodiment of the invention, the copolymers according to the invention are used together with comb polymers. These are polymers in which hydrocarbon radicals having at least 8, in particular at least 10, carbon atoms are bonded to a polymer backbone. They are preferably homopolymers whose alkyl side chains contain at least 8, and in particular at least 10 carbon atoms. In copolymers, at least 20%, preferably at least 30%, of the monomers have side chains (cf. Comb-like Polymers-Structure and Properties; N. A. Plate and V. P. Shibaev, J. Polym. Sci. Macromolecular Revs. 1974, 8, 117 ff). Examples of suitable comb polymers are, for example, fumarate/vinyl acetate copolymers (cf. EP 0 153 176 A1), copolymers of a $C_6$-$C_{24}$-α-olefin and an N—$C_6$-$C_{22}$-alkylmaleamide (cf. EP 0 320 766), and also esterified olefin/maleic anhydride copolymers, polymers and copolymers of α-olefins and esterified copolymers of styrene and maleic anhydride.

Comb polymers can be described, for example, by the formula

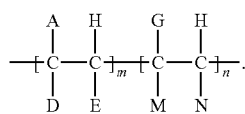

In this structure,
A is R', COOR', OCOR', R"—COOR' or OR';
D is H, $CH_3$, A or R;
E is H or A;
G is H, R", R"—COOR', an aryl radical or a heterocyclic radical;
M is H, COOR", OCOR", OR" or COOH;
N is H, R", COOR", OCOR, COOH or an aryl radical;
R' is a hydrocarbon chain having 8-150 carbon atoms;
R" is a hydrocarbon chain having from 1 to 24 carbon atoms;
m is a number between 0.4 and 1.0; and
n is a number between 0 and 0.6.

Olefin copolymers which are likewise suitable for use as further cold flow improvers can be derived directly from monoethylenically unsaturated monomers or be prepared indirectly by hydrogenating polymers which are derived from polyunsaturated monomers such as isoprene or butadiene. Apart from ethylene, preferred copolymers contain structural units which are derived from α-olefins having from 3 to 24 carbon atoms and molecular weights of up to 120 000. Preferrred α-olefins are propylene, butene, isobutene, n-hexene, isohexene, n-octene, isooctene, n-decene, isodecene. The comonomer content of olefins is preferably between 15 and 50 mol %, more preferably between 20 and 45 mol % and especially between 30 and 35 mol %. These copolymers may also contain small amounts, for example up to 10 mol %, of further comonomers, for example nonterminal olefins or nonconjugated olefins. Preference is given to ethylene-propylene copolymers.

The olefin copolymers may be prepared by known methods, for example by means of Ziegler or metallocene catalysts.

Further suitable flow improvers are polyoxyalkylene compounds, for example esters, ethers and ether/esters, which bear at least one alkyl radical having from 12 to 30 carbon atoms. When the alkyl groups stem from an acid, the remainder stems from a polyhydric alcohol (polyol); when the alkyl radicals come from a fatty alcohol, the remainder of the compound stems from a polyacid.

Suitable polyols are preferably polyethylene glycols, polypropylene glycols, polybutylene glycols and their copolymers having a molecular weight of from approx. 100 to approx. 5000, preferably from 200 to 2000. Also suitable are alkoxylates of polyols, for example of glycerol, trimethylolpropane, pentaerythritol, neopentyl glycol, and also the oligomers which have from 2 to 10 monomer units and are obtainable therefrom by condensation, for example polyglycerol. Preferred alkoxylates are those having from 1 to 100 mol, in particular from 5 to 50 mol, of ethylene oxide, propylene oxide and/or butylene oxide, per mole of polyol. Particular preference is given to esters.

Preference is given to using fatty acids having from 12 to 26 carbon atoms for reaction with the polyols to form the ester additives, preferably $C_{18}$- to $C_{24}$-fatty acids, especially stearic and behenic acid. The esters can also be prepared by esterification of polyoxyalkylated alcohols. Preference is given to fully esterified polyoxyalkylated polyols having molecular weights of from 150 to 2000, preferably from 200 to 600. Particularly suitable are PEG-600 dibehenate and glycerol-20-ethylene glycol tribehenate.

The mixing ratio (in parts by weight) of the additives according to the invention with ethylene copolymers, polar nitrogen compounds, deemulsifiers, antifoams, alkylphenol-aldehyde resins, comb polymers, olefin copolymers and/or polyoxyalkylene compounds is in each case from 1:10 to 20:1, preferably from 1:1 to 10:1.

The additive mixtures can be used alone or else together with other additives, for example with dewaxing assistants, corrosion inhibitors, antioxidants, lubricity additives, dehazers, conductivity improvers, cetane number improvers or sludge inhibitors.

EXAMPLES

The following additives were prepared:
The polymers were prepared as follows: ethylene, vinyl acetate and vinyl neodecanoate (VeoVa) or vinyl 2-ethylhexanoate (EHV) were polymerized in a high pressure autoclave with the addition of propionaldehyde as a molecular weight regulator (moderator). To this end, the monomer mixture, to which bis(2-ethylhexyl) peroxydicarbonate dissolved in white spirit (15% by weight solution) has been added, is fed into the reactor under a reaction pressure of 150 MPa at the temperature specified in table 1a. The residence time of the reactants in the autoclave was approx. 90 seconds. Table 1a compiles the polymerization conditions, table 1b the properties of the resulting terpolymers.

The vinyl acetate content was determined by pyrolysis of the polymer. To this end, 100 mg of the polymer with 200 mg of pure polyethylene are thermally depolymerized in a pyrolysis flask at 450° C. in a closed system under reduced pressure for 5 minutes, and the depolymerization gases are collected in a 250 ml round-bottom flask. The depolymerization product acetic acid is reacted with an NaI/KIO$_3$ solution, and the iodine released is titrated with Na$_2$S$_2$O$_3$ solution.

The degree of branching of the polymers is determined by $^1$H NMR spectroscopy (analyses in C$_2$D$_2$Cl$_4$ at 333 K; Bruker AM 360 spectrometer). In this context, the degree of branching is the number of CH$_3$ groups per 100 CH$_2$ groups of the poly(ethylene) with the exception of the methyl groups stemming from the acid radicals of the vinyl esters.

The viscosity was determined to ISO 3219 (B) with a rotary viscometer (Haake RV 20) with a plate-and-cone measurement system at 140° C.

TABLE 1a

Preparation of the terpolymers

Amount used (% by weight)

| Example No. | Ethylene | Vinyl acetate | Branched monomer | Temperature ° C. | Pressure MPa |
|---|---|---|---|---|---|
| P1 | 50.5 | 12.0 | 37.5 VeoVa | 190 | 1600 |
| P2 | 51.3 | 11.1 | 37.6 VeoVa | 190 | 1750 |
| P3 | 50.5 | 12.2 | 37.3 (VeoVa) | 190 | 1600 |
| P4 | 51.2 | 11.2 | 37.6 (VeoVa) | 160 | 1750 |
| P5 | 48.1 | 14.5 | 37.4 (VeoVa) | 190 | 1600 |
| P6 | 46.1 | 10.6 | 43.3 (VeoVa) | 220 | 1550 |
| P7 | 45.1 | 17.4 | 37.5 (VeoVa) | 190 | 1600 |
| P8 | 42.5 | 20.2 | 37.3 (VeoVa) | 190 | 1600 |
| P9 | 49.6 | 29.4 | 21.0 (VeoVa) | 160 | 1750 |
| P10 | 47.2 | 30.9 | 21.9 (VeoVa) | 220 | 1525 |
| P11 | 48.0 | 18.4 | 33.6 (EHV) | 190 | 1550 |

TABLE 1b

Characterization of the terpolymers

| Example No. | Vinyl acetate [mol %] | Branched monomer [mol %] | Σ comonomers [mol %] | [% by wt.] | V$_{140}$ [mPas] |
|---|---|---|---|---|---|
| P1 | 4.8 | 7.6 (VeoVa 10) | 12.4 | 44.0 | 147 |
| P2 | 4.6 | 8.0 (VeoVa 10) | 12.6 | 44.8 | 194 |
| P3 | 4.7 | 7.7 (VeoVa 10) | 12.5 | 43.9 | 63 |
| P4 | 4.7 | 8.3 (VeoVa 10) | 13.0 | 45.7 | 171 |
| P5 | 5.7 | 7.8 (VeoVa 10) | 13.5 | 45.7 | 166 |
| P6 | 4.5 | 9.3 (VeoVa 10) | 13.9 | 48.1 | 167 |
| P7 | 7.0 | 7.9 (VeoVa 10) | 15.0 | 47.7 | 167 |
| P8 | 7.4 | 7.8 (VeoVa 10) | 15.2 | 47.8 | 186 |
| P9 | 10.8 | 5.1 (VeoVa 10) | 15.9 | 46.2 | 128 |
| P10 | 11.2 | 4.6 (VeoVa 10) | 15.8 | 44.2 | 142 |
| P11 | 7.2 | 7.3 (EHV) | 14.5 | 43.8 | 132 |
| P12 (comp.) | 8.7 | 1.6 (EHV) | 10.3 | 28.8 | 168 |
| P13 (comp.) | 2.9 | 7.0 (EHV) | 9.9 | 30.0 | 218 |
| P14 (comp.) | 13.7 | 1.4 (VeoVa 10) | 15.1 | 37.8 | 97 |
| P15 (comp.) | 13.3 | — | 13.3 | 32.0 | 140 |
| P16 (comp.) | — | 7.5 (VeoVa 10) | 7.5 | 36.4 | 176 |

As a comparison, the effectiveness of various commercial ethylene-vinyl acetate and ethylene-VeoVa copolymers and also of different ethylene-vinyl acetate-VeoVa and ethylene-vinyl acetate-vinyl 2-ethylhexanoate terpolymers (EHV) are reported.

Characterization of the Test Oils:

The boiling parameters were determined to ASTM D-86, the CFPP value to EN 116 and the cloud point to ISO 3015. The boiling analysis was to ASTM D 86.

TABLE 2

Parameters of the test oils

| | Test oil 1 | Test oil 2 | Test oil 3 | Test oil 4 (comp.) |
|---|---|---|---|---|
| Destillation | | | | |
| IBP [° C.] | 202 | 170 | 191 | 169 |
| 20% [° C.] | 257 | 190 | 223 | 219 |
| 90% [° C.] | 346 | 297 | 319 | 339 |
| FBP [° C.] | 376 | 328 | 339 | 369 |
| Cloud Point [° C.] | −9.8 | −22.2 | −10.0 | −9.3 |
| CFPP [° C.] | −14 | −27 | −11 | −14 |
| Paraffin 10° below CP (DSC) | 4.2% | 3.6% | 4.5% | 2.7% |
| Density 15° C. [g/cm$^3$] | 0.828 | 0.831 | 0.828 | 0.842 |
| Sulfur content [ppm] | 8 | 26 | 9 | 420 |
| Aromatic content [% by wt.] | 14.3 | 18.3 | 16.7 | 24.6 |
| of which mono [% by wt.] | 12.6 | 15.7 | 15.1 | 20.6 |
| di [% by wt.] | 1.5 | 2.2 | 1.2 | 3.4 |
| poly [% by wt.] | 0.2 | 0.3 | 0.4 | 0.6 |

Solubility of the Additives

To test the solubility of the additives in the middle distillate, 500 ml of oil were admixed at 25° C. with 500 ppm of a 65% suspension of the additive to be tested (25° C.). The mixture was agitated vigorously for 30 seconds and subsequently filtered at a reduced pressure of 800 mbar through a membrane filter (cellulose nitrate, pore size 0.8 μm, Ø=47 mm). Filtration times of above 120 sec are regarded as not being filterable, in which case the filtrate volume obtained in this time gives an additional measure of the solubility of the additive.

TABLE 3

Filterability of additized low-aromatics middle distillates

| Example | Additive | Test oil | Oil temperature | Time [sec] | Volume [ml] |
|---|---|---|---|---|---|
| 1 | P1 | 1 | 25° C. | 65 | 500 |
| 2 | P2 | 1 | 25° C. | 71 | 500 |
| 3 | P3 | 1 | 25° C. | 69 | 500 |
| 4 | P4 | 1 | 25° C. | 64 | 500 |

TABLE 3-continued

Filterability of additized low-aromatics middle distillates

| Example | Additive | Test oil | Oil temperature | Time [sec] | Volume [ml] |
|---|---|---|---|---|---|
| 5 | P5 | 1 | 25° C. | 67 | 500 |
| 6 | P6 | 1 | 25° C. | 64 | 500 |
| 7 | P7 | 1 | 25° C. | 63 | 500 |
| 8 | P8 | 1 | 25° C. | 66 | 500 |
| 9 | P9 | 1 | 25° C. | 78 | 500 |
| 10 | P10 | 1 | 25° C. | 68 | 500 |
| 11 | P11 | 1 | 25° C. | 82 | 500 |
| 12 (comp.) | P12 | 1 | 25° C. | >120 | approx. 400 |
| 13 (comp.) | P13 | 1 | 25° C. | >120 | approx. 400 |
| 14 (comp.) | P14 | 1 | 25° C. | 115 | 500 |
| 15 (comp.) | P15 | 1 | 25° C. | >120 | approx. 180 |
| 16 (comp.) | P16 | 1 | 25° C. | insoluble | |
| 17 (comp.) | — | 1 | 25° C. | 60 | 500 ml |
| (comparative experiments) | | | | | |
| 18 (comp.) | P1 | 4 | 25° C. | 56 | 500 ml |
| 19 (comp.) | P3 | 4 | 25° C. | 59 | 500 ml |
| 20 (comp.) | P8 | 4 | 25° C. | 51 | 500 ml |
| 21 (comp.) | P12 | 4 | 25° C. | 115 | 500 ml |
| 22 (comp.) | P14 | 4 | 25° C. | 56 | 500 ml |
| 23 (comp.) | P15 | 4 | 25° C. | 110 | 500 ml |
| 24 (comp.) | — | 4 | 25° C. | 47 | 500 ml |

The comparison of the results in table 3 for test oil 1 with those for test oil 4 makes clear that the copolymers according to the invention exhibit their particular effectiveness precisely in the fuel oils defined in accordance with the invention, whereas the filtration problems to be solved in accordance with the task do not occur in fuel oils of deviating characteristics.

Effectivness of the Terpolymers as Cold Flow Improvers

Tables 4 to 6 describe the effectiveness of the ethylene-vinyl acetate-VeoVa and ethylene-vinyl acetate-vinyl 2-ethylhexanoate terpolymers obtained by the preparative examples as additives for mineral oils and mineral oil distillates with the aid of the CFPP test (cold filter plugging test to EN 116). The additives are used as 65% suspensions in kerosene:

TABLE 4

CFPP effectiveness in test oil 1

| Example No. | Terpolymer | 400 ppm | 800 ppm | 1200 ppm |
|---|---|---|---|---|
| 25 | P1 | −23 | −25 | −28 |
| 26 | P2 | −22 | −27 | −29 |
| 27 | P4 | −23 | −24 | −27 |
| 28 | P6 | −22 | −26 | −28 |
| 29 | P7 | −22 | −25 | −27 |
| 30 | P9 | −22 | −26 | −27 |
| 31 | P10 | −21 | −25 | −28 |
| 32 | P11 | −20 | −26 | −28 |
| 33 (comp.) | P12 | −20 | −23 | −25 |
| 34 (comp.) | P13 | −21 | −23 | −25 |
| 35 (comp.) | P14 | −22 | −26 | −26 |
| 36 (comp.) | P15 | −24 | −25 | −26 |

TABLE 5

CFPP effectiveness in test oil 2

| Example No. | Terpolymer | 350 ppm | 700 ppm | 1000 ppm |
|---|---|---|---|---|
| 37 | P1 | −30 | −32 | −38 |
| 38 | P2 | −29 | −32 | −37 |
| 39 | P3 | −29 | −34 | −35 |
| 40 | P4 | −30 | −32 | −37 |
| 41 | P5 | −28 | −37 | −40 |
| 42 | P6 | −30 | −34 | −39 |
| 43 | P7 | −31 | −38 | −38 |
| 44 | P8 | −29 | −40 | −42 |
| 45 | P9 | −30 | −35 | −38 |
| 46 | P10 | −30 | −34 | −36 |
| 47 | P11 | −28 | −31 | −32 |
| 48 (comp.) | P13 | −23 | −26 | −28 |
| 49 (comp.) | P14 | −22 | −23 | −22 |
| 50 (comp.) | P15 | −22 | −23 | −26 |
| 51 (comp.) | P16 | −22 | −22 | −23 |

TABLE 6

CFPP effectiveness in test oil 3

| Example No. | Terpolymer | 800 ppm | 1200 ppm |
|---|---|---|---|
| 52 | P2 | −24 | −26 |
| 53 | P3 | −25 | −27 |
| 54 | P5 | −23 | −25 |
| 55 | P8 | −24 | −26 |
| 56 | P9 | −22 | −23 |
| 57 | P10 | −23 | −24 |
| 58 (comp.) | P11 | −18 | −21 |
| 59 (comp.) | P12 | −21 | −21 |
| 60 (comp.) | P13 | −21 | −22 |
| 61 (comp.) | P14 | −20 | −21 |

List of the Trade Names Used

| | |
|---|---|
| Solvent Naphtha 180 ® Shellsol AB ® Solvesso 150 | Aromatic solvent mixtures having a boiling range of from 180 to 210° C. |
| ® Solvesso 200 | Aromatic solvent mixture having a boiling range of from 230 to 287° C. |
| ® Exxsol | Dearomatized solvent within various boiling ranges, for example ® Exxsol D60: from 187 to 215° C. |
| ® ISOPAR (Exxon) | Isoparaffinic solvent mixtures within various boiling ranges, for example ® ISOPAR L: from 190 to 210° C. |
| ® Shellsol D | Mainly aliphatic solvent mixtures within various boiling ranges |

What is claimed is:

1. A fuel oil having improved filterability consisting of
   A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers
   a) bivalent structural units derived from ethylene of the formula 1

$$—CH_2—CH_2— \qquad (1)$$

b) from 5 to 12 mol % of bivalent structural units of the formula 2

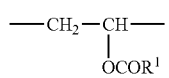
   $$\qquad\qquad 2$$

where $R^1$ is a saturated, tertiary-branched $C_5$-$C_{18}$-alkyl, and
   c) from 4 to 13 mol % of bivalent structural units of the formula 3

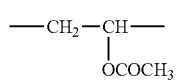
   $$\qquad\qquad 3$$

wherein a sum of molar proportion of comonomers b) and c) is between 12 and 16 mol %, and,
   d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof, and D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

2. The fuel oil of claim 1, wherein the molar proportion of the comonomer b) is between 5 and 11 mol %.

3. The fuel oil of claim 1, wherein the molar proportion of comonomer c) is between 4.6 and 9 mol %.

4. The fuel oil of claim 1, wherein the comonomer b) is a vinyl ester of branched carboxylic acids having from 5 to 15 carbon atoms.

5. The fuel oil of claim 1, wherein the copolymer has a molecular weight (by GPO against poly(styrene)) of from 3000 to 15 000 g/mol.

6. The fuel oil of claim 1, wherein the copolymer has a degree of branching determined by means of NMR between 2 and 9 $CH_3$/100 $CH_2$ groups, not taking into account the methyl groups of the comonomers.

7. The fuel oil of claim 1, wherein the copolymer has a melt viscosity at 140° C. of from 20 to 10000 mPas.

8. The fuel oil of claim 1, wherein the total aromatic content of the mineral oil middle distillate is below 18% by weight.

9. The fuel oil of claim 1, wherein the mineral oil middle distillate has a 90-20% boiling range of less than 110° C.

10. The fuel oil of claim 1, wherein the mineral oil middle distillate has a paraffin content by DSC of more than 3% by weight of precipitated paraffins at 10° C. below the cloud point.

11. The fuel oil of claim 1, wherein the mineral oil middle distillate has a density of less than 0.840 g/cm³.

12. A fuel oil having improved filterability consisting of

A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers
   a) bivalent structural units derived from ethylene of the formula 1

$$—CH_2—CH_2— \qquad (1)$$

b) from 5 to 12 mol % of bivalent structural units of the formula 2

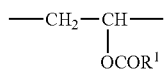
   $$\qquad\qquad 2$$

where $R^1$ is a saturated, tertiary-branched $C_5$-$C_{18}$-alkyl, and
   c) from 4 to 13 mol % of bivalent structural units of the formula 3

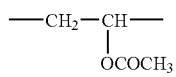
   $$\qquad\qquad 3$$

wherein a sum of molar proportion of comonomers b) and c) is between 12 and 16 mol %, and,
   d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and at least one polar nitrogen compound.

13. A fuel oil having improved filterability consisting of

A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers
   a) bivalent structural units derived from ethylene of the formula 1

$$—CH_2—CH_2— \qquad (1)$$

b) from 5 to 12 mol % of bivalent structural units of the formula 2

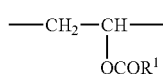  2 where $R^1$ is a saturated, tertiary-branched $C_5$-$C_{18}$-alkyl, and
c) from 4 to 13 mol % of bivalent structural units of the formula 3

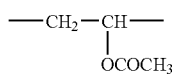  3 wherein a sum of molar proportion of comonomers b) and c) is between 12 and 16 mol %, and,
d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and at least one alkylphenol-aldehyde resin.

14. A fuel oil having improved filterability consisting of
A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and
B) a cold flow additive consisting of a proportion of at least one copolymer of ethylene and vinyl esters, said copolymer consisting of comonomers
a) bivalent structural units derived from ethylene of the formula 1

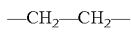  (1)

b) from 5 to 12 mol % of bivalent structural units of the formula 2

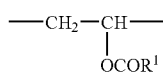  2 where $R^1$ is a saturated, tertiary-branched $C_5$-$C_{18}$-alkyl, and
c) from 4 to 13 mol % of bivalent structural units of the formula 3

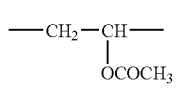  3 wherein a sum of molar proportion of comonomers b) and c) is between 12 and 16 mol %, and,
d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and at least one comb polymer.

15. A fuel oil having improved filterability consisting of
A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and
B) a cold flow additive consisting of a proportion of at least one copolymer of ethylene and vinyl esters, said copolymer consisting of comonomers
a) bivalent structural units derived from ethylene of the formula 1

  (1)

b) from 5 to 12 mol % of bivalent structural units of the formula 2

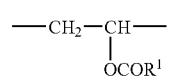  2 where $R^1$ is a saturated, tertiary-branched $C_5$-$C_{18}$-alkyl, and
c) from 4 to 13 mol % of bivalent structural units of the formula 3

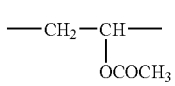  3 wherein a sum of molar proportion of comonomers b) and c) is between 12 and 16 mol %, and,
d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and at least one polyoxyalkylene derivative.

16. A method for improving the cold flow behavior and filterability of a fuel oil consisting of
A) a mineral oil middle distillate or a mixture of mineral oil middle distillate and a mixture of fatty acid alkyl esters, said middle distillate having a sulfur content of at most 350 ppm, a total aromatics content of at most 22% by weight of said middle distillate, said method comprising adding to the fuel oil
B) a cold flow additive consisting of a copolymer of ethylene and vinyl esters, the copolymer of ethylene and vinyl esters consisting of comonomers
a) bivalent structural units derived from ethylene of the formula 1

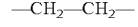  (1)

b) from 5 to 12 mol % of bivalent structural units of the formula 2

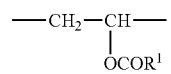  2 where $R^1$ is saturated, tertiary-branched $C_5$-$C_{18}$-alkyl, and c) from 4 to 13 mol % of bivalent structural units of the formula 3

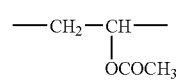

wherein a sum of molar proportions of structural units of the formulae 2 and 3 is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof, and D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

17. The method of claim 16, wherein the molar proportion of the comonomer b) is between 5 and 11 mol %.

18. The method of claim 16, wherein the molar proportion of comonomer c) is between 4.6 and 9 mol %.

19. The method of claim 16, wherein the comonomer b) is a vinyl ester of branched carboxylic acids having from 5 to 15 carbon atoms.

20. The method of claim 16, wherein the copolymer has a molecular weight (by GPO against poly(styrene)) of from 3000 to 15 000 g/mol.

21. The method of claim 16, wherein the copolymer has a degree of branching determined by means of NMR between 2 and 9 $CH_{3/100}$ $CH_2$ groups, not taking into account the methyl groups of the comonomers.

22. The method of claim 16, wherein the copolymer has a melt viscosity at 140° C. of from 20 to 10000 mPas.

23. The method of claim 16, wherein the total aromatic content of the mineral oil middle distillate is below 18% by weight.

24. The method of claim 16, wherein the mineral oil middle distillate has a 90-20% boiling range of less than 110° C.

25. The method of claim 16, wherein the mineral oil middle distillate has a paraffin content by DSC of more than 3% by weight of precipitated paraffins at 1000 below the cloud point.

26. The method of claim 16, wherein the mineral oil middle distillate has a density of less than 0.840 g/cm³.

27. A fuel oil having improved filterability consisting of
A) a proportion of mineral oil middle distillate and from 5 to 25% by weight of a mixture of fatty acid alkyl esters, said mineral oil middle distillate having a sulfur content of at most 350 ppm, a total aromatics content of at most 22% by weight of said mineral oil middle distillate, and
B) a cold flow additive consisting of a proportion of at least one copolymer of ethylene and vinyl esters, said copolymer consisting of comonomers
a) bivalent structural units derived from ethylene of the formula 1

 (1)

b) from 5 to 12 mol % of bivalent structural units of the formula 2

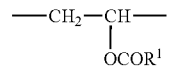

where $R^1$ is a saturated, tertiary-branched $C_5$-$C_{18}$-alkyl, and c) from 4 to 13 mol % of bivalent structural units of the formula 3

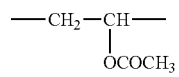

wherein a sum of molar proportion of comonomers b) and c) is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof, D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

28. The fuel oil of claim 1, wherein the mixture of fatty acid alkyl esters are derived from fatty acids having from 14 to 24 carbon atoms and alcohols having from 1 to 4 carbon atoms.

29. The fuel oil of claim 1, wherein the mixture of fatty acid alkyl esters is selected from the group consisting of rape seed methyl ester and mixtures of rape seed methyl esters and further vegetable oil esters.

30. The fuel oil of claim 1, wherein the mixture of fatty acid methyl esters comprises rape seed methyl esters.

31. A fuel oil having improved filterability consisting of
A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and
B) a cold flow additive consisting of a proportion of at least one copolymer of ethylene and vinyl esters, said copolymer consisting of comonomers
a) bivalent structural units derived from ethylene of the formula 1

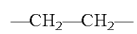 (1)

b) from 5 to 12 mol % of bivalent structural units of the formula 2

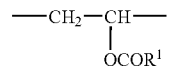

where $R^1$ is a saturated, tertiary-branched $C_5$-$C_{18}$-alkyl, and c) from 4 to 13 mol % of bivalent structural units of the formula 3

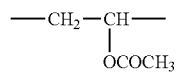
(3)

wherein a sum of molar proportion of comonomers b) and c) is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof.

32. A fuel oil having improved filterability consisting of

A) a proportion of mineral oil middle distillate or a proportion of mineral oil distillate and a mixture of fatty acid alkyl esters, said fuel oil having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers a) bivalent structural units derived from ethylene of the formula 1

(1)

b) from 5 to 12 mol % of bivalent structural units of the formula 2

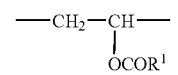
(2)

where $R^1$ is a saturated, tertiary-branched $C_5$-$C_{18}$-alkyl, and c) from 4 to 13 mol % of bivalent structural units of the formula 3

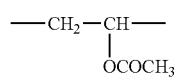
(3)

wherein a sum of molar proportion of comonomers b) and c) is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

33. A method for improving the cold flow behavior and filterability of a fuel oil consisting of A) a mineral oil middle distillate or a mixture of mineral oil middle distillate and a mixture of fatty acid alkyl esters, said middle distillate having a sulfur content of at most 350 ppm, a total aromatics content of at most 22% by weight of said middle distillate, said method comprising adding to the fuel oil B) a cold flow additive consisting of a copolymer of ethylene and vinyl esters, the copolymer of ethylene and vinyl esters consisting of comonomers a) bivalent structural units derived from ethylene of the formula 1

(1)

b) from 5 to 12 mol % of bivalent structural units of the formula 2

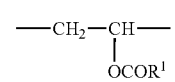
(2)

where $R^1$ is saturated, tertiary-branched $C_5$-$C_{18}$-alkyl, and c) from 4 to 13 mol % of bivalent structural units of the formula 3

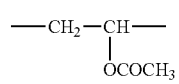
(3)

wherein a sum of molar proportions of structural units of the formulae 2 and 3 is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof.

34. A method for improving the cold flow behavior and filterability of a fuel oil consisting of A) a mineral oil middle distillate or a mixture of mineral oil middle distillate and a mixture of fatty acid alkyl esters, said middle distillate having a sulfur content of at most 350 ppm, a total aromatics content of at most 22% by weight of said middle distillate, said method comprising adding to the fuel oil B) a cold flow additive consisting of a copolymer of ethylene and vinyl esters, the copolymer of ethylene and vinyl esters consisting of comonomers a) bivalent structural units derived from ethylene of the formula 1

(1)

b) from 5 to 12 mol % of bivalent structural units of the formula 2

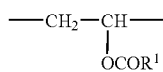
(2)

where $R^1$ is saturated, tertiary-branched $C_5$-$C_{18}$-alkyl, and c) from 4 to 13 mol % of bivalent structural units of the formula 3

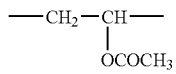
(3)

wherein a sum of molar proportions of structural units of the formulae 2 and 3 is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

35. A fuel oil having improved filterability consisting of

A) a proportion of mineral oil middle distillate and from 5 to 25% by weight of a mixture of fatty acid alkyl esters, said mineral oil middle distillate having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers a) bivalent structural units derived from ethylene of the formula 1

b) from 5 to 12 mol % of bivalent structural units of the formula 2

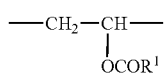
(2)

where $R^1$ is a saturated, tertiary-branched $C_5$-$C_{18}$-alkyl, and c) from 4 to 13 mol % of bivalent structural units of the formula 3

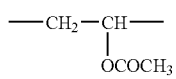
(3)

wherein a sum of molar proportion of comonomers b) and c) is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and C) at least one compound selected from the group consisting of a polar nitrogen compound, an alkylphenol-aldehyde resin, a comb polymer, a polyoxyalkylene derivative, and mixtures thereof.

36. A fuel oil having improved filterability consisting of

A) a proportion of mineral oil middle distillate and from 5 to 25% by weight of a mixture of fatty acid alkyl esters, said mineral oil middle distillate having a sulfur content of at most 350 ppm, a total aromatics content of at most 22% by weight of said mineral oil middle distillate, and B) a cold flow additive consisting of a proportion of at least one copolymer of ethylene and vinyl esters, said copolymer consisting of comonomers a) bivalent structural units derived from ethylene of the formula 1

b) from 5 to 12 mol % of bivalent structural units of the formula 2

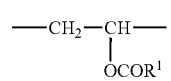
(2)

where $R^1$ is a saturated, tertiary-branched $C_5$-$C_{18}$-alkyl, and c) from 4 to 13 mol % of bivalent structural units of the formula 3

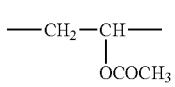
(3)

wherein a sum of molar proportion of comonomers b) and c) is between 12 and 16 mol %, and, d) up to 5 mol % of a further comonomer selected from the group consisting of olefins having from 3 to 18 carbon atoms, esters of acrylic acid or methacrylic acid with $C_1$-$C_{18}$-alcohols, $C_1$-$C_{18}$-alkyl vinyl ethers, and mixtures thereof, and D) at least one additive selected from the group consisting of a dewaxing assistant, a corrosion inhibitor, an antioxidant, a lubricity additive, a dehazer, a conductivity improver, a cetane number improver, a sludge inhibitor, and mixtures thereof.

* * * * *